(12) United States Patent
Kim et al.

(10) Patent No.: US 12,078,246 B2
(45) Date of Patent: Sep. 3, 2024

(54) PIVOT SHAFT TENSIONER ASSEMBLY

(71) Applicant: GATES CORPORATION, Denver, CO (US)

(72) Inventors: Sangkyu Kim, Milton (CA); Michael Koppeser, Windsor (CA)

(73) Assignee: Gates Corporation, Denver, CO (US)

( * ) Notice: Subject to any disclaimer, the term of this patent is extended or adjusted under 35 U.S.C. 154(b) by 0 days.

(21) Appl. No.: 17/832,808

(22) Filed: Jun. 6, 2022

(65) Prior Publication Data

US 2022/0389990 A1  Dec. 8, 2022

Related U.S. Application Data

(60) Provisional application No. 63/197,910, filed on Jun. 7, 2021.

(51) Int. Cl.
*F16H 7/12* (2006.01)
*F16H 7/08* (2006.01)

(52) U.S. Cl.
CPC .... *F16H 7/1281* (2013.01); *F16H 2007/0802* (2013.01); *F16H 2007/0806* (2013.01); *F16H 2007/081* (2013.01); *F16H 7/0829* (2013.01); *F16H 2007/0865* (2013.01); *F16H 2007/0893* (2013.01)

(58) Field of Classification Search
CPC ...... F16H 7/02; F16H 7/08; F16H 2007/0802; F16H 2007/081; F16H 2007/0806; F16H 2007/0863; F16H 2007/0865; F16H 2007/0893; F16H 7/10; F16H 7/12; F16H 7/1209; F16H 7/1245; F16H 7/1254; F16H 7/1281; F16H 7/0829; F16H 7/0831; F16H 7/0838; F16H 2007/0874; F16H 2007/0804; F16H 2007/0808; F02B 67/04; F02B 67/06
See application file for complete search history.

(56) References Cited

U.S. PATENT DOCUMENTS

| | | | | |
|---|---|---|---|---|
| 4,312,267 A | * | 1/1982 | Shenberger | F16H 7/1281 474/135 |
| 4,822,322 A | * | 4/1989 | Martin | F16H 7/129 474/135 |
| 4,826,471 A | * | 5/1989 | Ushio | F16H 7/1281 474/135 |
| 4,834,694 A | * | 5/1989 | Martin | F16H 7/129 474/135 |
| 4,917,655 A | | 4/1990 | Martin | |
| 4,983,145 A | | 1/1991 | Hirai et al. | |

(Continued)

OTHER PUBLICATIONS

Mail Stop PCT, ATTN: ISA/US, Commisioner for Patents; Notification of Transmittal of the International Search Report and the Written Opinion of the International Searching Authority; International Patent application No. PCT/US2022/032296; mailing date: Sep. 6, 2022.

*Primary Examiner* — Michael R Mansen
*Assistant Examiner* — Raveen J Dias
(74) *Attorney, Agent, or Firm* — Kevin J. Aiken, Esq.

(57) ABSTRACT

A belt tensioner for a belt system having a compression spring internal to the tensioning arm, the tensioning arm pivotable in relation to the pivot shaft and the tensioner base. The compression spring provides an axial force against an axially slidable hub bearing, which moves to accommodate variations in spring force and/or dimensional changes.

10 Claims, 9 Drawing Sheets

(56) References Cited

U.S. PATENT DOCUMENTS

| | | | | |
|---|---|---|---|---|
| 5,083,983 A * | 1/1992 | Hirai | F16H 7/1218 | 474/135 |
| 5,234,385 A * | 8/1993 | Kawashima | F16H 7/1218 | 474/135 |
| 5,266,067 A * | 11/1993 | Gapco | F16H 7/1281 | 474/135 |
| 5,334,109 A * | 8/1994 | Izutsu | F16H 7/1218 | 474/135 |
| 5,370,585 A * | 12/1994 | Thomey | F16H 7/1218 | 474/135 |
| 5,620,385 A | 4/1997 | Cascionale et al. | | |
| 5,772,549 A * | 6/1998 | Berndt | F16H 7/1281 | 474/135 |
| 6,196,941 B1 * | 3/2001 | Ohta | F16H 7/1218 | 474/135 |
| 6,932,731 B2 * | 8/2005 | Kaiser | F16H 7/1218 | 474/135 |
| 7,507,172 B2 * | 3/2009 | Lehtovaara | F16H 7/1218 | 474/109 |
| 7,803,078 B2 * | 9/2010 | D'Silva | F16H 7/1218 | 474/112 |
| 8,002,657 B2 * | 8/2011 | Antchak | F16H 7/1281 | 474/135 |
| 8,142,315 B2 * | 3/2012 | Dell | F16H 7/1281 | 474/138 |
| 8,529,387 B2 * | 9/2013 | Lannutti | F16D 13/76 | 192/113.32 |
| 8,613,680 B2 * | 12/2013 | Frankowski | F16H 7/1218 | 474/135 |
| 8,684,872 B2 * | 4/2014 | Mevissen | F16H 7/1218 | 474/135 |
| 8,888,627 B2 * | 11/2014 | Crist | F16H 7/1218 | 474/135 |
| 8,926,462 B2 * | 1/2015 | Ward | F16H 7/12 | 474/135 |
| 9,212,731 B2 * | 12/2015 | Lindstrom | F16H 7/1218 | 474/135 |
| 9,618,098 B2 * | 4/2017 | Ward | F16H 7/1281 | |
| 2008/0194366 A1 * | 8/2008 | Mevissen | F16H 7/1281 | 474/135 |
| 2008/0220919 A1 * | 9/2008 | Antchak | F16H 7/1218 | 474/135 |
| 2009/0054186 A1 * | 2/2009 | Stegelmann | F16H 7/1281 | 474/135 |
| 2009/0275432 A1 * | 11/2009 | Dell | F16H 7/1281 | 474/135 |
| 2010/0137084 A1 * | 6/2010 | Mevissen | F16H 7/1281 | 474/135 |
| 2010/0147646 A1 * | 6/2010 | Lannutti | F16D 13/76 | 192/41 S |
| 2011/0207568 A1 * | 8/2011 | Smith | F16H 7/1218 | 474/135 |
| 2011/0287881 A1 * | 11/2011 | Gomez | F16H 7/1245 | 474/133 |
| 2011/0294615 A1 | 12/2011 | Crist | | |
| 2012/0058847 A1 * | 3/2012 | Ferguson | F16H 7/1218 | 474/135 |
| 2012/0058848 A1 * | 3/2012 | Lannutti | F16H 7/1218 | 474/135 |
| 2014/0113755 A1 | 4/2014 | Ward et al. | | |
| 2014/0274510 A1 * | 9/2014 | Dutil | F16H 7/0831 | 474/135 |
| 2015/0031485 A1 * | 1/2015 | Lindstrom | F16H 7/1218 | 474/135 |
| 2015/0119176 A1 * | 4/2015 | Ward | F16H 7/1218 | 474/112 |

* cited by examiner

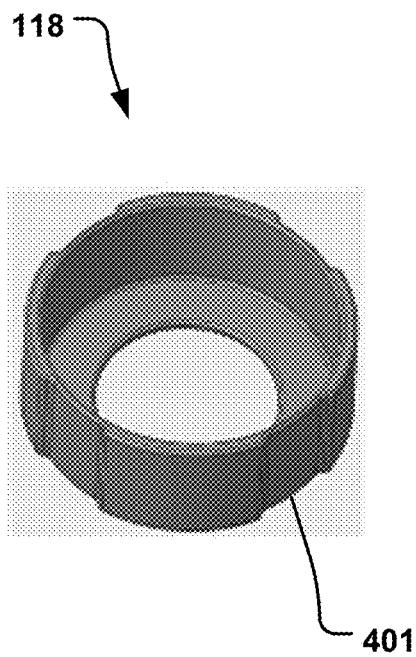
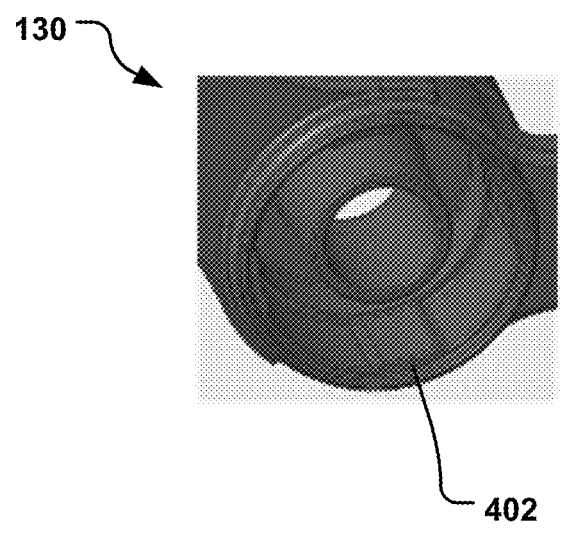
FIG. 4A
FIG. 4B

PIVOT SHAFT TENSIONER ASSEMBLY

BACKGROUND

Belt tensioners are generally well known devices that are used in many belt-drive systems. Tensioners generally apply a constant belt-tensioning force, which compensates for increases in belt length due to wear, belt expansion (e.g., due to increased temperature) and other factors.

A common type of belt tensioner has a fixed structure and a pivoted structure eccentrically mounted on the fixed structure by a pivot assembly, and the pivoted structure has a belt-engaging pulley rotationally mounted on it. A coil spring surrounds the pivot assembly and has its ends connected between the fixed and pivoted structures to bias the pivot structure in a belt take-up direction. As the pivoted structure moves from a position of minimum belt take-up to a position of maximum belt take-up, the spring biasing force decreases. Despite this varying spring force over the range of tensioner movement, substantially constant belt tension is maintained by the tensioner.

Another common type of belt tensioner has a central bearing that defines a pivot axis for the belt tensioning arm and has a bearing sleeve which is connected to the tensioning arm. The bearing extends through the bearing sleeve which is mounted in a friction-damping manner by a plain bearing arrangement, so as to be pivotable about the bearing. Belleville washers positioned around the pivot axis provide a biasing and damping force in the axial direction.

There is always room for alternate designs of belt tensioners.

SUMMARY

The present disclosure provides a tensioner for a belt system that has a compression spring internal to the tensioning arm, the tensioning arm pivotable in relation to the pivot shaft and the tensioner base. The compression spring provides an axial force against an axially slidable hub bearing, which moves to accommodate variations in spring force and/or dimensional changes. In some designs, frictional wear occurs at the interface between a bearing sleeve around the pivot shaft and the interface between the tensioning arm and the bottom of a hub bearing and the tensioner base. In other designs, frictional wear occurs at the interface between the bearing sleeve and the tensioning arm and the interface between the bottom of the hub bearing and the tensioning arm.

In one particular implementation, this disclosure provides belt tensioner for a belt drive, the tensioner comprising a tensioner base and a tensioning arm axially aligned on a pivot shaft defining a pivot axis, the tensioning arm pivotal in relation to the tensioner base about the pivot axis, and a compression spring positioned around the pivot shaft and extending axially, the compression spring having a first end against an axially moveable hub bearing positioned around the pivot shaft.

In another particular implementation, this disclosure provides a belt tensioner for a belt drive comprising a tensioner base and a tensioning arm having a pulley connected thereto, a pivot shaft defining a pivot axis, the pivot axis through the tensioner base and the tensioning arm, a bearing sleeve positioned around the pivot shaft, an axially moveable hub bearing positioned around the pivot shaft, the hub bearing comprising first features engageable with second features inhibiting rotational movement of the hub bearing, and a compression spring positioned around the pivot shaft and extending axially, the compression spring having a first end proximate the hub bearing.

BRIEF DESCRIPTION OF THE FIGURES

FIG. 4A is a perspective view of a hub bearing of the tensioner of FIGS. 1 and 2; and FIG. 4B is a perspective view of a portion of the tensioning arm of the tensioner.

DETAILED DESCRIPTION

Figure 1:
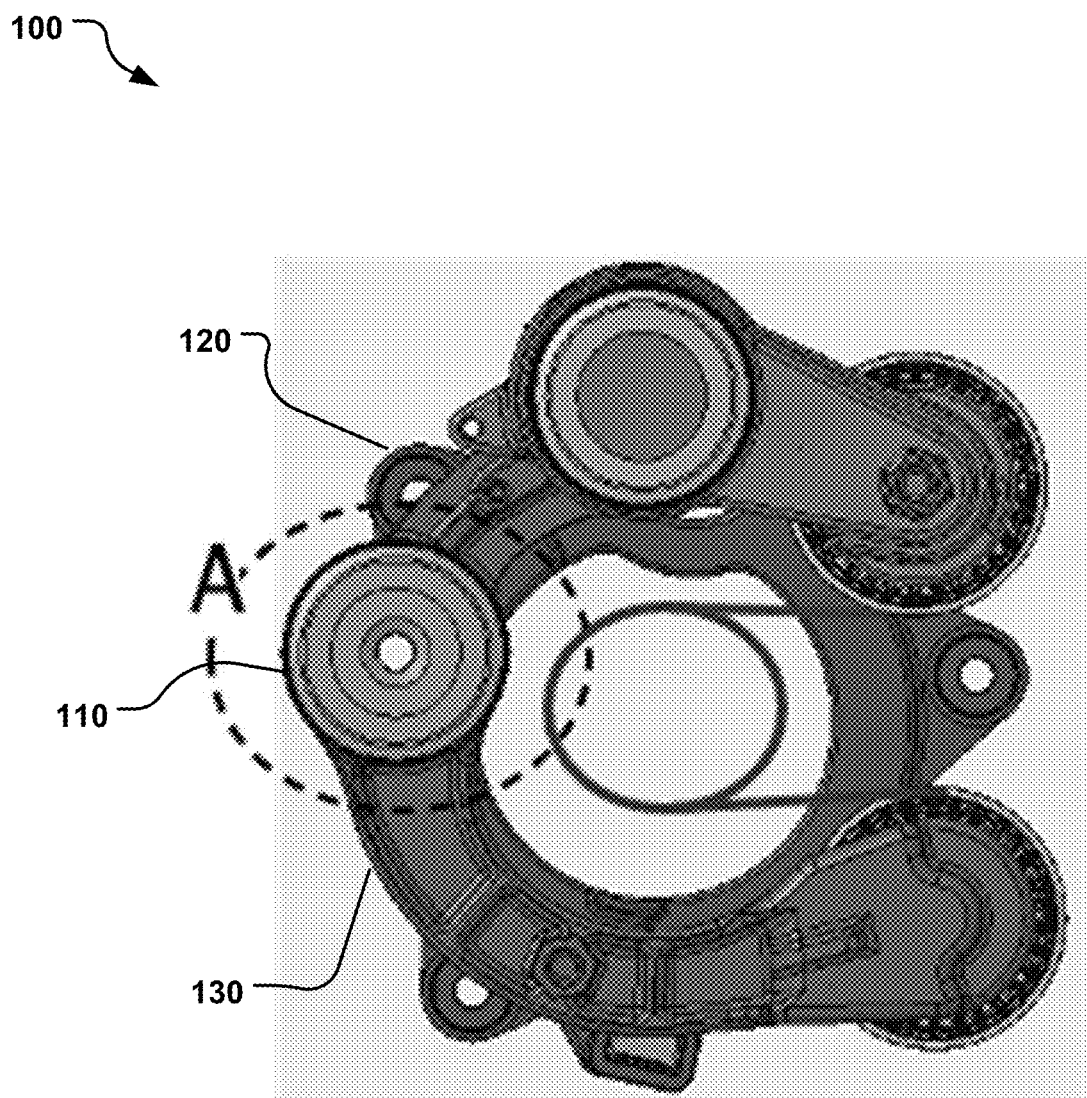
FIG. 1 is a top perspective view of a portion of an engine including a tensioner.

As indicated above, the present disclosure is directed to belt tensioners having an internal compression spring in the tensioning arm.

In the following description, reference is made to the accompanying drawing that forms a part hereof and in which is shown by way of illustration at least one specific implementation. The following description provides additional specific implementations. It is to be understood that other implementations are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples, including the figures, provided below. In some instances, a reference numeral may have an associated sub-label consisting of a lower-case letter to denote one of multiple similar components. When reference is made to a reference numeral without specification of a sub-label, the reference is intended to refer to all such multiple similar components.

Turning to the figures, FIG. 1 shows a portion of an automotive engine 100, particularly, a hybrid engine, showing a tensioner 110 connecting a base structure 120 and a tensioning arm 130 that is pivotable in relation to the base structure 120 about a pivot axis defined by the tensioner 110. Although this tensioner 110 is particularly shown as part of a hybrid automotive engine and having a long tensioning arm 130, the tensioner 110 may be modified as needed for use in any application where it would be suitable.

Figure 2:
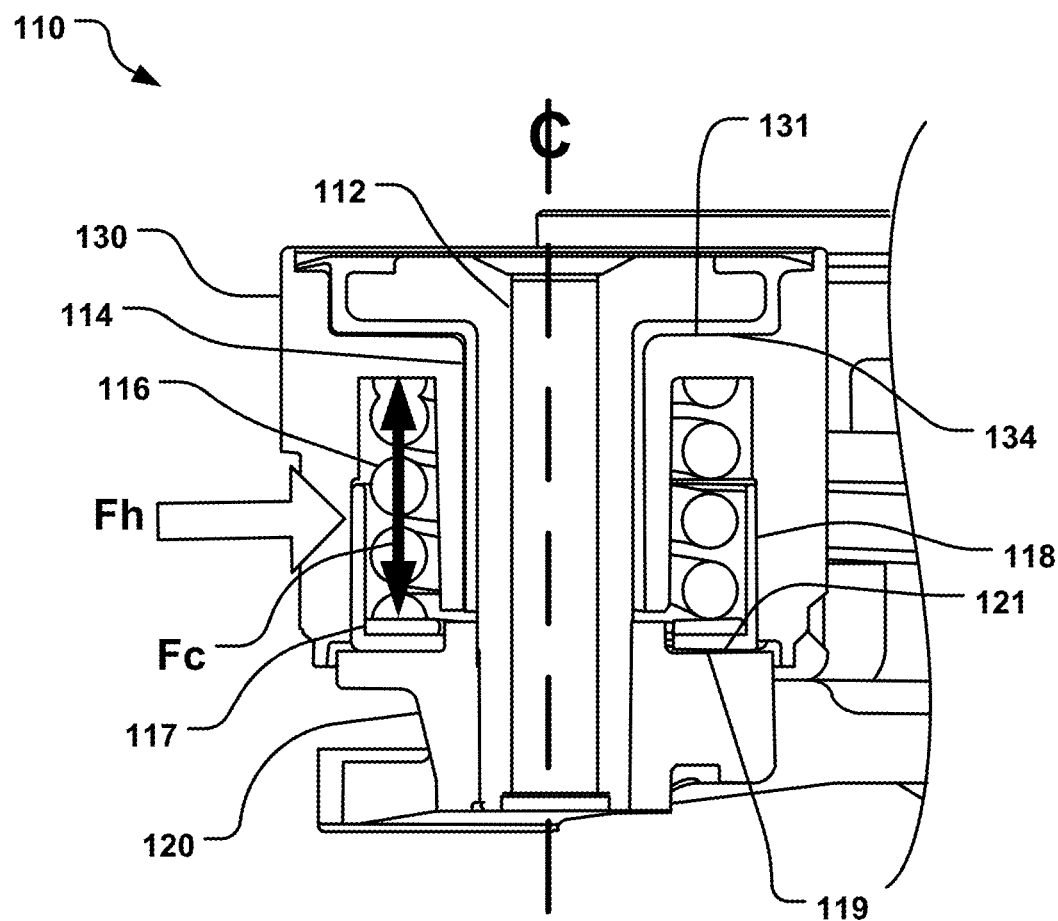
FIG. 2 is a cross-sectional side view of the tensioner of FIG. 1.
Figure 3:
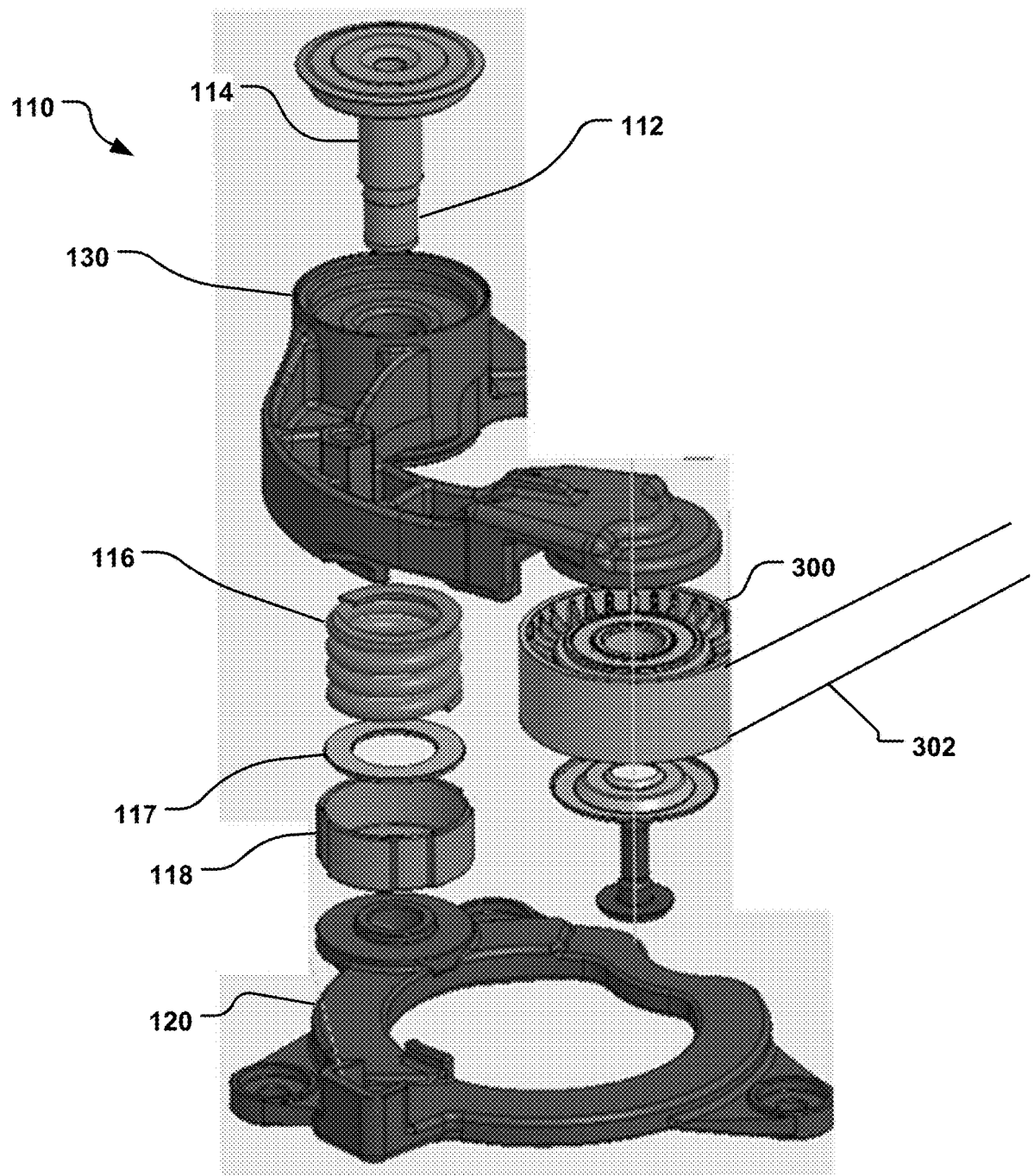
FIG. 3 is an exploded perspective view of the tensioner of FIGS. 1 and 2 as part of a belt system, showing the tensioning arm of the tensioner connected to a pulley and a belt.

FIG. 2 is a cross-sectional side view of the tensioner 110, particularly, highlighted at "A" in FIG. 1; FIG. 3 also shows the tensioner 110, in an exploded view.

The base structure 120 and the tensioning arm 130 rotationally mate with each other to form the tensioner 110. A pivot shaft 112 extends through the base 120 and the tensioning arm 130 and defines the pivot axis of the tensioner 110, or, the axis of rotation between the base 120 and the tensioning arm 130. The pivot shaft 112 is fixed in relation to the base 120. The pivot shaft 112 rests on a top surface 131 of the tensioning arm 130 and the tensioning arm 130 rotates or pivots about or at least partially around the pivot shaft 112.

A surface bearing sleeve 114 surrounds the pivot shaft 112 and extends the length of the engagement of the tensioning arm 130 with the pivot shaft 112; in some implementations, the bearing sleeve 114 is integral with the pivot shaft 112. In other implementations, the bearing sleeve 114 is fixed to the tensioning arm 130, and can rotate with the tensioning arm in relation to the pivot shaft 112 and the base 120. The bearing sleeve 114 has a lower surface 134 that is in frictional contact with the top surface 131 of the tensioning arm 130.

The tensioning arm 130 includes an aperture or void in which is positioned a compression spring 116; the aperture may be fully or only partially defined by the tensioning arm 130. The compression spring 116 is centered around the pivot shaft 112 and the axis of rotation and extends axially. The compression spring 116 may be a helical spring having a constant diameter or a varying diameter along its length. Any suitable helix type, wire diameter and/or cross-section (e.g., circular, rectangular, oval), material, free length, and spring end types can be used for the compression spring 116. In some implementations, alternate designs may be used for the compression spring 116; for example, a volute spring, torsional spring, or leaf spring may be used. In some implementations, two springs may be used; e.g., two compression springs in parallel, or a compression spring can be an internal spring and a torsional spring can be an external spring.

A first or bottom end of the compression spring 116 is seated against a washer 117 (e.g., a flat washer or plain washer) that seats in the bottom of a hub bearing 118 that is positioned around the pivot shaft 112. A second or top end of the compression spring 116 seats against the end of the aperture in the tensioning arm 130. A lower surface 119 of the hub bearing 118 rests on and is in frictional contact with a top surface 121 of the base 120.

When the tensioning arm 130 rotates in relation to the base 120, frictional forces are present where the top surface 131 of the tensioning arm 130 contacts the pivot shaft 112 and the bearing sleeve 114 at surface 134, and where the lower surface 119 of the hub bearing 118 contacts the top surface 121 of the base 120.

As indicated above, FIG. 3 is an exploded perspective view of the tensioner 110 as part of a belt system, showing the tensioning arm 130 of the tensioner connected to a pulley and a belt. FIG. 3 illustrates the alignment of the pivot shaft 112 with the compression spring 116, the washer 117 and the hub bearing 118. The bearing sleeve 114 is shown around the pivot shaft 112. Also shown in FIG. 3, at the end of the tensioning arm 130 is a pulley 300 having a belt 302 thereon, the belt 302 tensioned by the tensioner 110.

It is noted that the components including the pivot shaft 112, the bearing sleeve 114, the compression spring 116, the washer 117, and the hub bearing 118 are generally radially symmetrical about the central pivot axis. Seen in FIG. 1, the base structure 120 and the tensioning arm 130 are not symmetrical about the pivot axis.

FIG. 4A shows the hub bearing 118 and FIG. 4B shows a portion of the tensioning arm 130 with which the hub bearing 118 engages to inhibit rotation of the hub bearing 118 in relation to the tensioning arm 130. As explained above, the hub bearing 118 rotates in relation to the base 120. The hub bearing 118 has features described as recesses, detents or slots 401 in or on its outer surface. Although the particular design shown has four slots 401, more or less may be used. The tensioning arm 130 has a corresponding feature on an inner surface, such as ribs 402, that engage with the slots 401. In other designs, the hub bearing can have ribs and the tensioning arm can have slots.

With the ribs 401 and the slots 402 engaged, the hub bearing 118 and the tensioning arm 130 are rotationally fixed (e.g., they cannot rotate in respect to one another) but are movable (slidable) in relation to each other in the axial direction.

With this coupling or engagement between the hub bearing 118 and the tensioning arm 130, the compression spring 116, the washer 117, and the locked hub bearing 118 and the tensioning arm 130 rotate together as one unit, inhibiting the compression spring 116 from rotating separately from the tensioning arm 130, thus inhibiting relative torsional motion, which can result in vibration noise. Also inhibited from rotating is the washer 117, thus further inhibiting torsional motion and vibration noise.

As these parts rotate, friction motion occurs at the top surface 131 of the tensioning arm 130 and the lower surface 119 of the hub bearing 118 under compression load from the compression spring 116. Based on the selection of the compression spring 116, this friction motion provides a proper damping value for the belt connected to and tensioned by the tensioning arm 130; an example of such a belt is one of an ABDS (Accessory Belt Drive System).

In one particular implementation of this design, the compression spring 116 has a low spring rate, e.g., 1500 N/10 mm, or 150 N/mm; in other implementations, the spring rate may be, e.g., no more than 600 N/mm, e.g., 50 N/mm to 500 N/mm, or e.g., 100 N/mm to 300 N/mm. The compression force (Fc, shown in FIG. 2) inhibits the tensioning arm 130 from tilting or pivoting in relation to the pivot axis due to the hub load (Fh, shown in FIG. 2). With such spring rates, the resulting compression force has a small variation in spite of the large variation of dimensional length of the stacked components in the axial direction when measured from the top surface 131 of the tensioning arm 130 to the opposite end of the pivot shaft 112. In this implementation of the design, with the particular compression spring 116, a stack-up variation of 1 mm from all of the components produces only a 150 N force variation. This is significantly less than in a conventional tensioner using a Belleville washer, where the spring rate of the Belleville washer is approximately 1500 N/1.5 mm, or, 1000 N/mm, so that stack-up variation of 1 mm products a 1000 N force variation.

Over time, due to extended pivotal movement the tensioning arm 130 experiences during service, the friction contact areas between the top surface 131 of the tensioning arm 130 and the pivot shaft 112 and the lower surface 119 of the hub bearing 118 and the base 120 experience physical wear. In this implementation of the design, with the particular compression spring 116 with a low spring rate described above, the reduction of the compression spring force due to the physical wear is minimal. The hub bearing 118 will slide axially to adjust for any worn material without any rotational movement in relation to the tensioning arm 130 due to the engagement of the slots 401 on the hub bearing 118 with the ribs 402 on the tensioning arm 130. The engagement of the slots 401 with the ribs 402 further inhibits the tensioning arm 130 from tilting or pivoting due to the hub load (Fh) from belt tension in the belt system, maintaining good alignment of the pulley 300 with the belt 302.

Additionally, having little or no variation in the compression force (Fc) inhibits variation in the damping value of the tensioner 110.

Thus, shown and described in relation to FIGS. 1, 2, 3 and 4A and 4B is a tensioner for a belt system that has a compression spring internal to the tensioning arm, the spring rotationally fixed to the tensioning arm which is pivotable in relation to the pivot shaft and the tensioner base. Frictional wear occurs at the interface between the bearing sleeve and the tensioning arm and the bottom of the hub bearing and the tensioner base.

Figure 5:
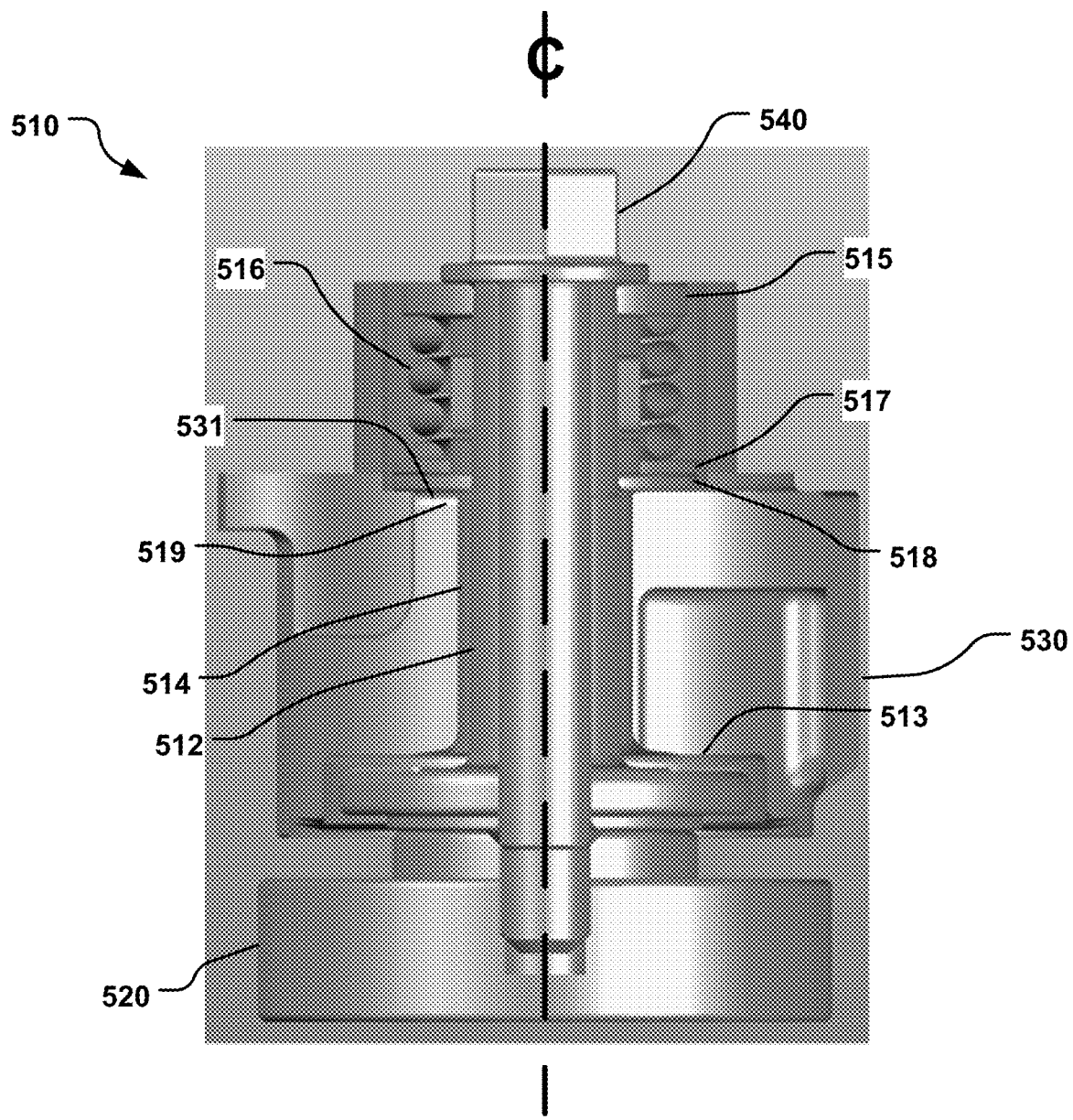
FIG. 5 is a cross-sectional side view of a second design of a tensioner.
Figure 6:
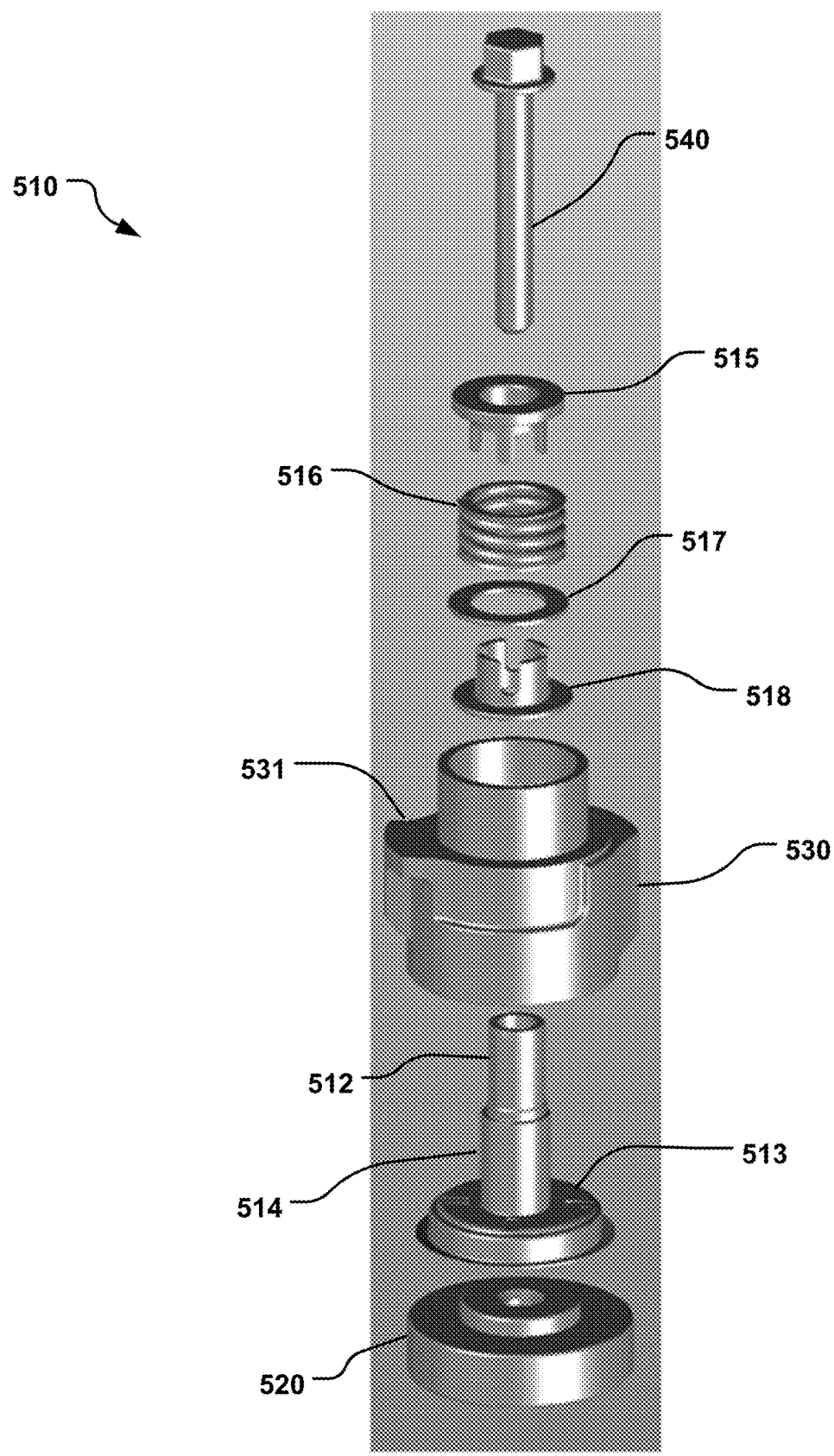
FIG. 6 is an exploded perspective view of the tensioner of FIG. 5.
Figure 7:
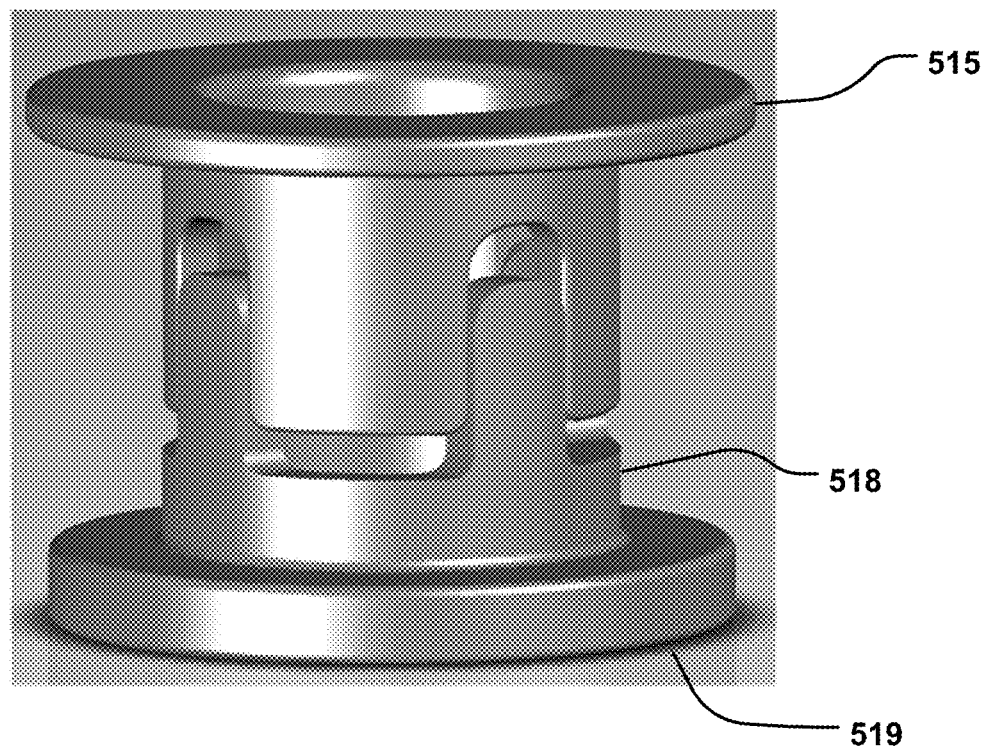
FIG. 7 a perspective view of a hub bearing and flanged tube of the tensioner of FIGS. 5 and 6.

An alternate design of a tensioner 510 is illustrated in FIGS. 5 through 7. FIG. 5 is a cross-sectional side view of the tensioner 510, and FIG. 6 shows the tensioner 510 in an exploded view. It is to be understood that various features and/or details from the tensioner 110, described above, may be applied to this tensioner 510 unless contrary to the construction.

As with the previous design, the base structure 520 and the tensioning arm 530 rotationally mate with each other to form the tensioner 510. A pivot shaft 512 extends through the base 520 and the tensioning arm 530 and defines the pivot axis of the tensioner 510, or, the axis of rotation between the base 520 and the tensioning arm 530. The pivot shaft 512 is fixed in relation to the base 520, and in some implementations, the pivot shaft 512 is integral with the base structure 520.

A surface bearing sleeve 514 surrounds the pivot shaft 512 and extends the length of the engagement of the tensioning arm 530 with the pivot shaft 512. In some implementations, the bearing sleeve 514 is fixed to the tensioning arm 530; thus, the bearing sleeve 514 and the tensioning arm 530 together rotate in relation to the pivot shaft 512 and the base 520. In some other implementations, the bearing sleeve 514 is fixed to the pivot shaft 512, whereas in some other implementations is integral with the pivot shaft 512. Thus, the tensioning arm 530 rotates in relation to the to the pivot shaft 512 and the bearing sleeve 514.

The tensioning arm 530 includes an aperture or void in which is positioned a compression spring 516; the compression spring 516 is centered around the pivot shaft 512 and the axis of rotation. At a first end, the compression spring 516 is seated against a washer 517 that seats in the bottom of a hub bearing 518. The hub bearing 518 has a bottom surface 519 that rests on and is in frictional contact with a top surface 531 of the tensioning arm 530. At the other, second end, the compression spring 516 seats against a flanged tube 515, which is fixed to the pivot shaft 512. The flanged tube 515 and the hub bearing 518 together with the compression spring 516 are in the aperture in the tensioning arm 530.

When the tensioning arm 530 rotates in relation to the base 520, frictional forces are present where the tensioning arm 530 contacts a top surface 513 of the bearing sleeve 514 around the pivot shaft 512, and where the bottom surface 519 of the hub bearing 518 contacts the top surface 531 of the tensioning arm 530.

As indicated above, FIG. 6 is an exploded perspective view of the tensioner 510. FIG. 6 illustrates the alignment of the pivot shaft 512 with the compression spring 516, the washer 517 and the hub bearing 518 and the flange 515. A bolt 540 retains the various parts together; a flanged bolt, such as seen in FIG. 5, helps retain the flanged tube 515 and the other components.

FIG. 7 shows the hub bearing 518 (having a bottom surface 519) and the flanged tube 515 engaged to inhibit rotation relative to each other. Each of the hub bearing 518 and the flanged tube 515 includes features, that when engaged, inhibit relative rotation; in this particular implementation, the features are offset, intermeshing legs or fingers. This engagement between the hub bearing 518 and the flanged tube 515 forms a coupling joint.

In this design of the tensioner 510, the tensioning arm 530 rotates about the pivot axis providing friction at the interface of the bottom surface 519 of the hub bearing 518 with the tensioning arm 530 and the interface of the top surface 513 of the bearing sleeve 514 with the tensioning arm 530. The components such as the hub bearing 518, the washer 517, and the compression spring 516 do not rotate, due to the coupling joint shown in FIG. 7 formed by the flanged tube 515 and the hub bearing 518. The hub bearing 518 is configured to slide in the axial direction around the pivot shaft 512 for easy installation of the compression spring 516 and to compensate for physical wear of the parts (e.g., the bearing sleeve 514, the hub bearing 518, the tensioning arm 530) during use over time.

As in the previous design, the compression spring 516 has a low spring rate, e.g., 1500 N/10 mm, or 150 N/mm. The compression force of the spring 516 inhibits the tensioning arm 530 from tilting or pivoting in relation to the pivot axis. With a low spring rate, the compression force has a small variation in spite of the large variation of dimensional length of the stacked components in the axial direction when measured from the top surface of the plate flange 515 to the opposite end of the pivot shaft 512.

Due to extended pivotal movement the tensioning arm 530 experiences during use over time, the friction contact areas between the top surface 531 of the tensioning arm 530 and the lower surface 519 of the hub bearing 518 and the surface 513 of the bearing sleeve 514 and the tensioning arm 530 experience physical wear. In this implementation of the design, with the particular compression spring 516 with a low spring rate described above, the reduction of the compression spring force due to the physical wear is minimal. The hub bearing 518 will slide axially to adjust for any worn material without any rotational movement in relation to the tensioning arm 530 due to the engagement of the hub bearing 518 with the flanged tube 515, as shown in FIG. 7.

Thus, shown and described in relation to FIGS. 5, 6 and 7 is another tensioner for a belt system that has a compression spring internal to the tensioning arm, the spring rotationally fixed to the flanged tube which is pivotable in relation to the pivot shaft and the tensioner base. Frictional wear occurs at the interface between the bearing sleeve and the tensioning arm and the bottom of the hub bearing and the tensioning arm.

Figure 8:
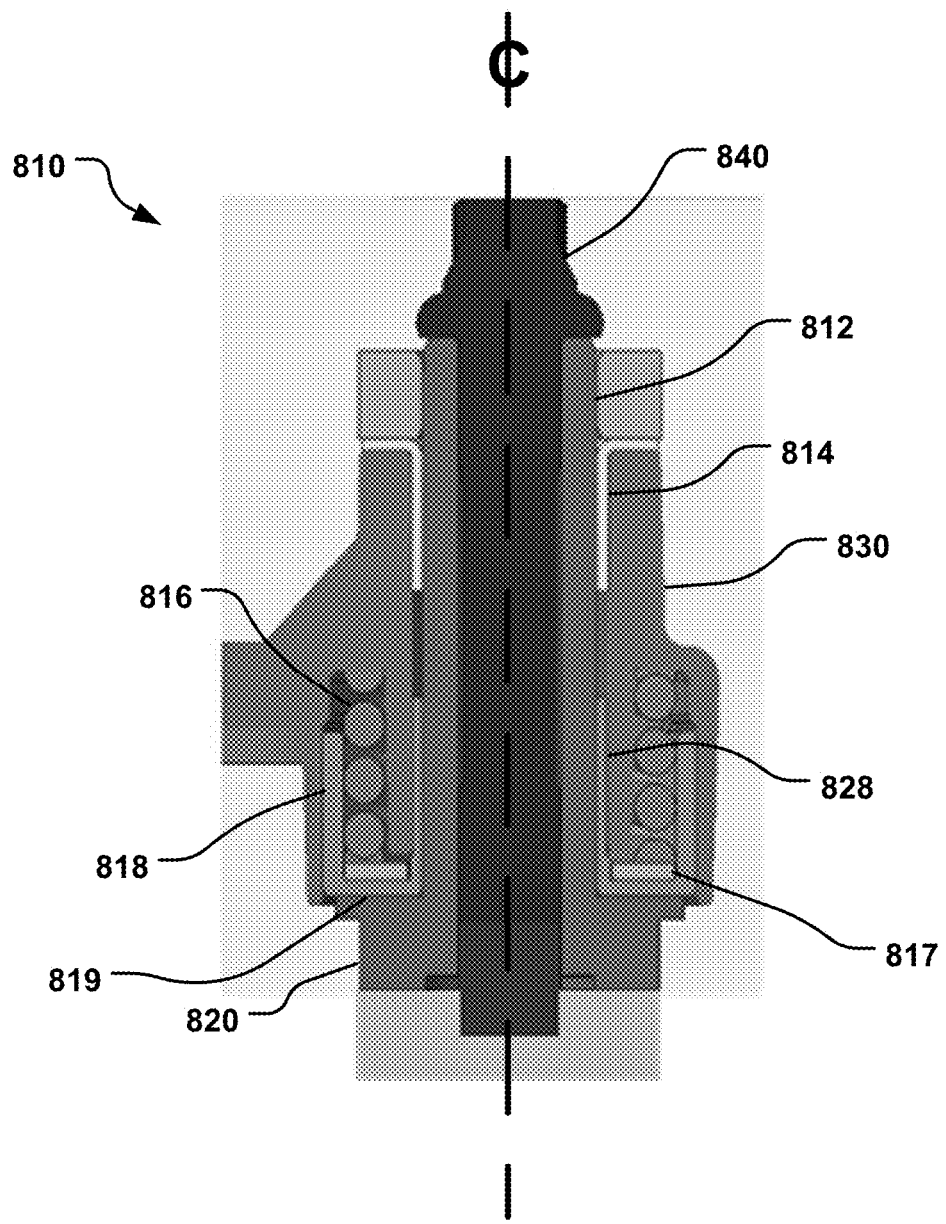
FIG. 8 is a cross-sectional side view of a third design of a tensioner.

Another alternate design of a tensioner 810 is illustrated in FIG. 8. It is to be understood that various features and/or details from the tensioners 110, 510 described above, may be applied to this tensioner 810 unless contrary to the construction.

As with the previous design, the base structure 820 and the tensioning arm 830 rotationally mate with each other to form the tensioner 810. A pivot shaft 812 integral with the base 820 extends through the tensioning arm 830 and defines the pivot axis of the tensioner 810, or, the axis of rotation between the base 820 and the tensioning arm 830.

A surface bearing sleeve 814 surrounds the pivot shaft 812. In some implementation, the bearing sleeve 814 and the tensioning arm 830 together rotate in relation to the pivot shaft 812 and the base 820, whereas in other implementations, the tensioning arm 830 rotates in relation to the to the pivot shaft 812 and the bearing sleeve 814.

The tensioning arm 830 includes an aperture or void in which is positioned a compression spring 816; the compression spring 816 is centered around the pivot shaft 812 and the axis of rotation. At a first end, the compression spring 816 is seated against a washer 817 that seats in the bottom of a hub bearing 818. The hub bearing 818 has a bottom surface 819 that rests on and is in frictional contact with a top surface of the base 820. In this design, the hub bearing 818 has an integrated inner side bearing sleeve 828 that contacts the pivot shaft 812. The hub bearing 818 also includes recessed or slotted features (similar to the slots 401 in the bearing hub 118 in FIG. 4A) to couple the hub bearing 818 to the tensioning arm 830. A bolt 840 retains the various parts together.

When the tensioning arm 830 rotates in relation to the base 820, frictional forces are present where the top of the tensioning arm 830 contacts the bearing sleeve 814 and around the pivot shaft 812, and where the bottom surface 819 of the hub bearing 818 contacts the top surface of the base 820.

Thus, shown and described in relation to FIG. 8 is a tensioner for a belt system that has a compression spring internal to the tensioning arm, the spring rotationally fixed to the tensioning arm which is pivotable in relation to the pivot shaft and the tensioner base. Frictional wear occurs at the interface between the bearing sleeve and the tensioning arm and the bottom of the hub bearing and the tensioner base.

Figure 9:
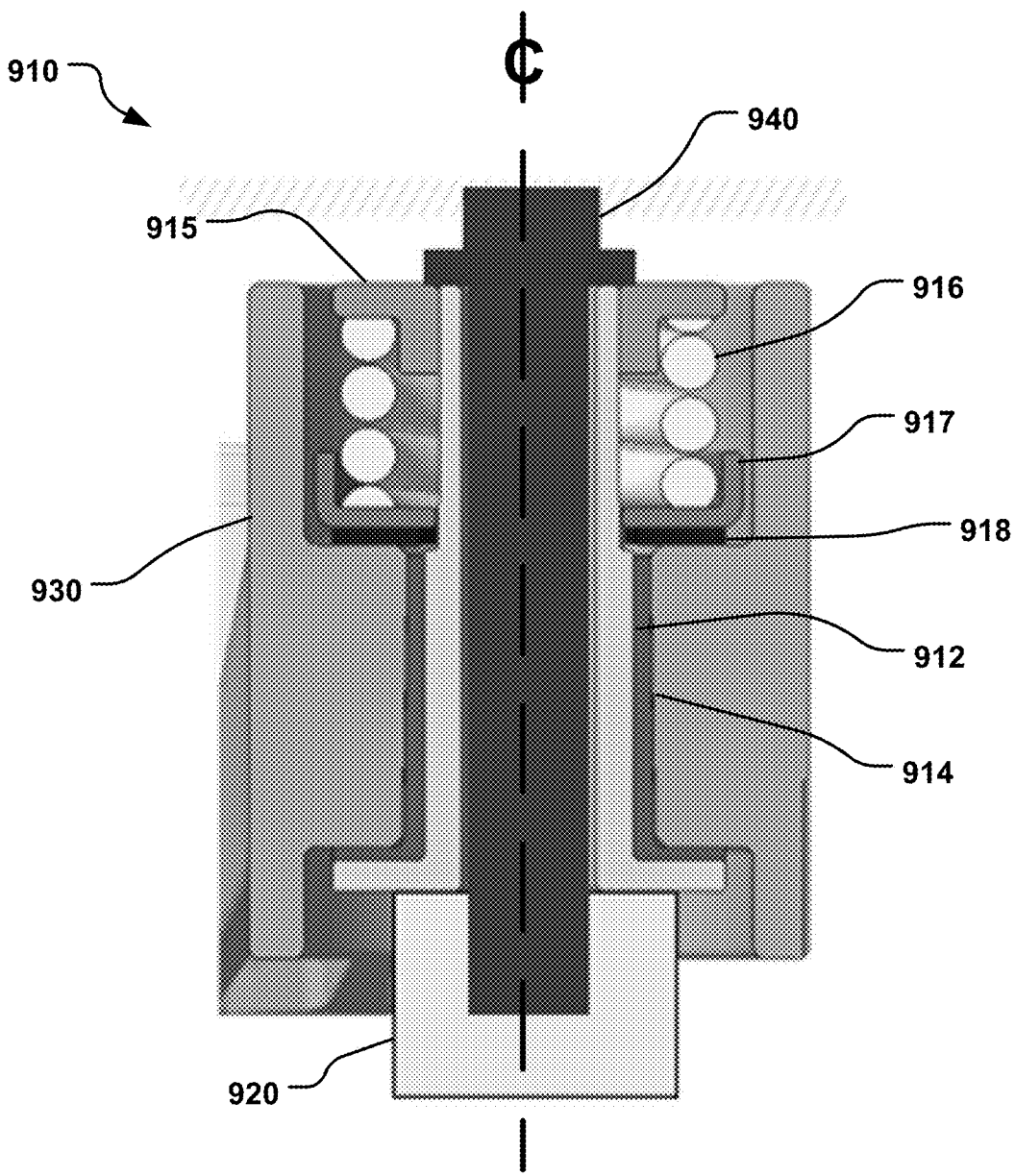
FIG. 9 is a cross-sectional side view of a fourth design of a tensioner.

Yet another alternate design of a tensioner 910 is illustrated in FIG. 9. It is to be understood that various features and/or details from the tensioners 110, 510, 810 described above, may be applied to this tensioner 910 unless contrary to the construction.

As with the previous design, the base structure 920 and the tensioning arm 930 rotationally mate with each other to form the tensioner 910. A pivot shaft 912 fixed to the base 920 extends through the tensioning arm 930 and defines the pivot axis of the tensioner 910, or, the axis of rotation between the base 920 and the tensioning arm 930. A surface bearing sleeve 914 surrounds the pivot shaft 912.

The tensioning arm 930 includes an aperture or void in which is positioned a compression spring 916; the compression spring 916 is centered around the pivot shaft 912 and the axis of rotation. At a first end, the compression spring 916 is seated against a walled washer 917 that seats on a flat bearing 918 that rides on a shoulder of the pivot shaft 912. The flat bearing 918 has a bottom surface that rests on and is in frictional contact with a top surface of the base 920. In such a design, the flat internal base of the walled washer 917 inhibits rotation against the pivot shaft 912. At the other, second end, the compression spring 916 seats against a flanged tube 915, which is fixed to the pivot shaft 912. The flanged tube 915 and the flat bearing 918 together with the compression spring 916 are in the aperture in the tensioning arm 930 and are fixed to the pivot shaft 912. The flat bearing 918 is in frictional contact on both its surfaces, with the tensioning arm 930 on one surface and with the walled washer 917 on the other surface. A bolt 940 retains the various parts together.

Thus, shown and described in relation to FIG. 9 is a tensioner for a belt system that has a compression spring internal to the tensioning arm, the spring rotationally fixed to the tensioning arm which is pivotable in relation to the pivot shaft and the tensioner base.

The various components or parts of the tensioners 110, 510, 810, 910 may be formed of any suitable material, including metal (e.g., iron, steel), composite materials (e.g., ceramics), polymeric materials, and any combination thereof. Any of the components or parts may have a coating thereon to, e.g., decrease surface friction, increase durability and decrease physical wear, increase chemical resistance, etc.

The above specification and examples provide a complete description of the structure and use of exemplary implementations of the invention. The above description provides specific implementations. It is to be understood that other implementations are contemplated and may be made without departing from the scope or spirit of the present disclosure. The above detailed description, therefore, is not to be taken in a limiting sense. While the present disclosure is not so limited, an appreciation of various aspects of the disclosure will be gained through a discussion of the examples provided.

The tensioners described herein and variations thereof may be incorporated into a broad range of belt drive systems and other systems that utilize tensioners, including ABDS (accessory belt drive systems), SBDS (synchronous belt drive system), BSG (belt starter generator, e.g., for hybrid vehicles), dual arm tensioners, CVT (continuously variable transmissions), serpentine belts, water pumps, timing, etc. The tensioners can be used with v-belts, micro-v belts, double v belts, flat belts, round belts, etc., that may be made from rubber or polymer (e.g., polyurethane) and may be reinforced.

Unless otherwise indicated, all numbers expressing feature sizes, amounts, and physical properties are to be understood as being modified by the term "about," whether or not the term "about" is immediately present. Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Spatially related terms, including but not limited to, "bottom," "lower", "top", "upper", "beneath", "below", "above", "on top", "on," etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

What is claimed is:

1. A belt tensioner for a belt drive, comprising a tensioner base and a tensioning arm axially aligned about a pivot shaft defining a pivot axis, the tensioning arm pivotal in relation to the tensioner base about the pivot axis, a compression spring positioned around the pivot shaft and extending axially for providing an axial spring force, wherein the compression spring has a spring rate of 50 N/mm to 500 N/mm, the compression spring having a first end proximal to an axially moveable hub bearing positioned around the pivot shaft, and a washer in the hub bearing between the first end of the compression spring and the hub bearing.

2. The tensioner of claim 1, further comprising a bearing sleeve about the pivot shaft positioned between the pivot shaft and the tensioning arm.

3. The tensioner of claim 1, wherein the compression spring is positioned in an aperture at least partially defined by the tensioning arm.

4. The tensioner of claim 3, wherein the compression spring is positioned in the aperture defined by the tensioning arm and the tensioner base.

5. The tensioner of claim 1, wherein an outer surface of the hub bearing comprises a first feature and an inner surface of the tensioning arm comprises a second feature, the first feature and the second feature engageable to inhibit relative rotation between the hub bearing and the tensioning arm.

6. The tensioner of claim 5, wherein the first feature is a slot and the second feature is a rib.

7. The tensioner of claim 1, further comprising a flanged tube around and fixed to the pivot shaft, the flanged tube engageable with the hub bearing to inhibit relative rotation between the hub bearing and the flanged tube.

8. The tensioner of claim 1, wherein the hub bearing has an inner side bearing sleeve that contacts the pivot shaft.

9. The tensioner of claim 1, wherein the spring rate of the compression spring is about 150 N/mm.

10. A belt tensioner for a belt drive, comprising:
- a tensioner base and a tensioning arm having a pulley connected thereto;
- a pivot shaft connected to the tensioner base and defining a pivot axis, the pivot axis extending through the tensioner base and the tensioning arm;
- a bearing sleeve around the pivot shaft;
- an axially moveable hub bearing positioned around the pivot shaft, the hub bearing comprising first features engageable with second features inhibiting rotational movement of the hub bearing;
- a compression spring positioned around the pivot shaft and extending axially, the compression spring having a first end proximate the hub bearing, wherein the compression spring has a spring rate of 50 N/mm to 500 N/mm; and
- a washer in the hub bearing between the first end of the compression spring and the hub bearing.

* * * * *